Dec. 22, 1931.  H. A. W. JOSLYN  1,837,269
SAFETY DIMMER
Filed Jan. 30, 1928    2 Sheets-Sheet 2
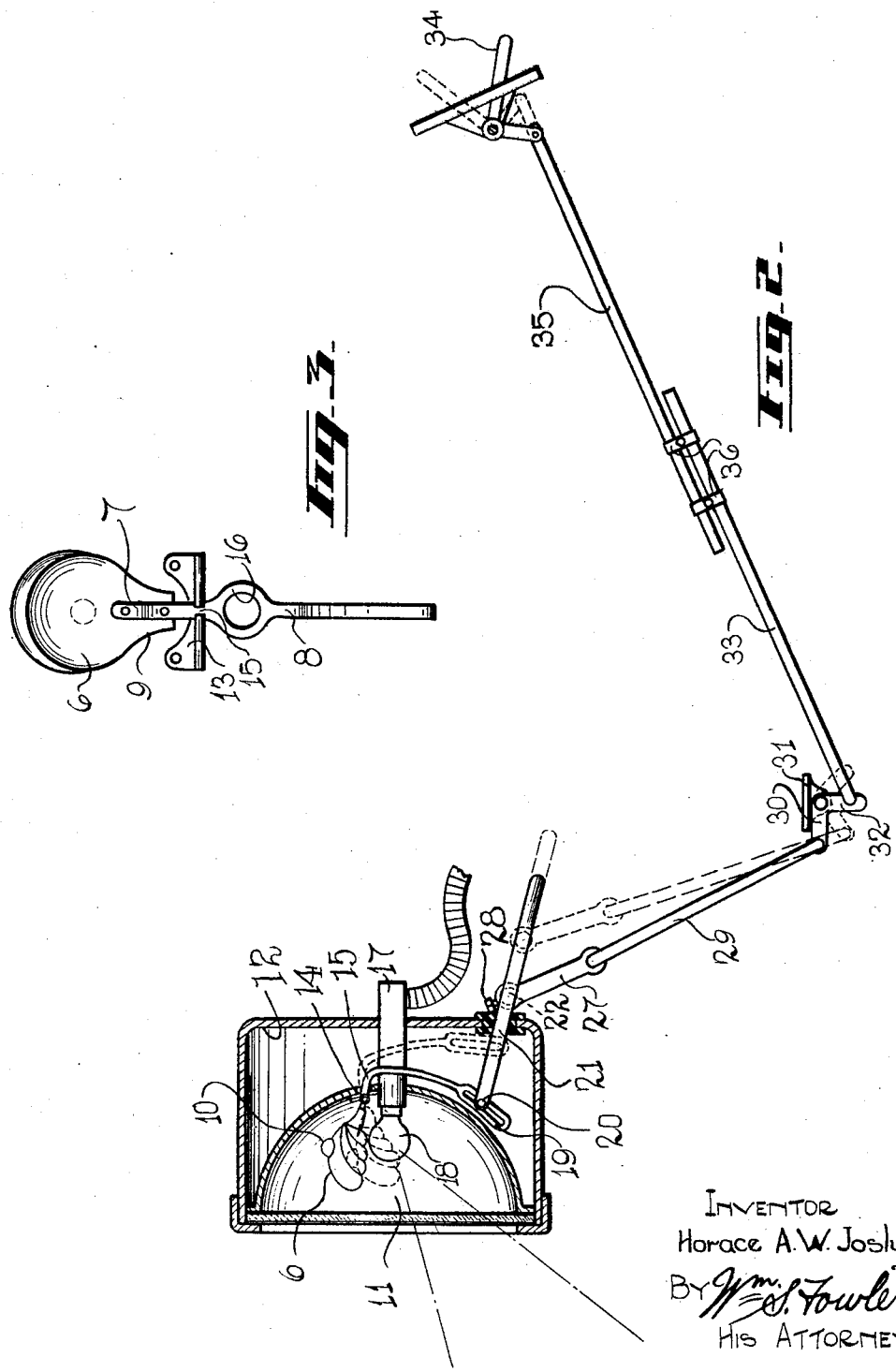
INVENTOR
Horace A. W. Joslyn
BY Wm. S. Fowler,
HIS ATTORNEY Patented Dec. 22, 1931

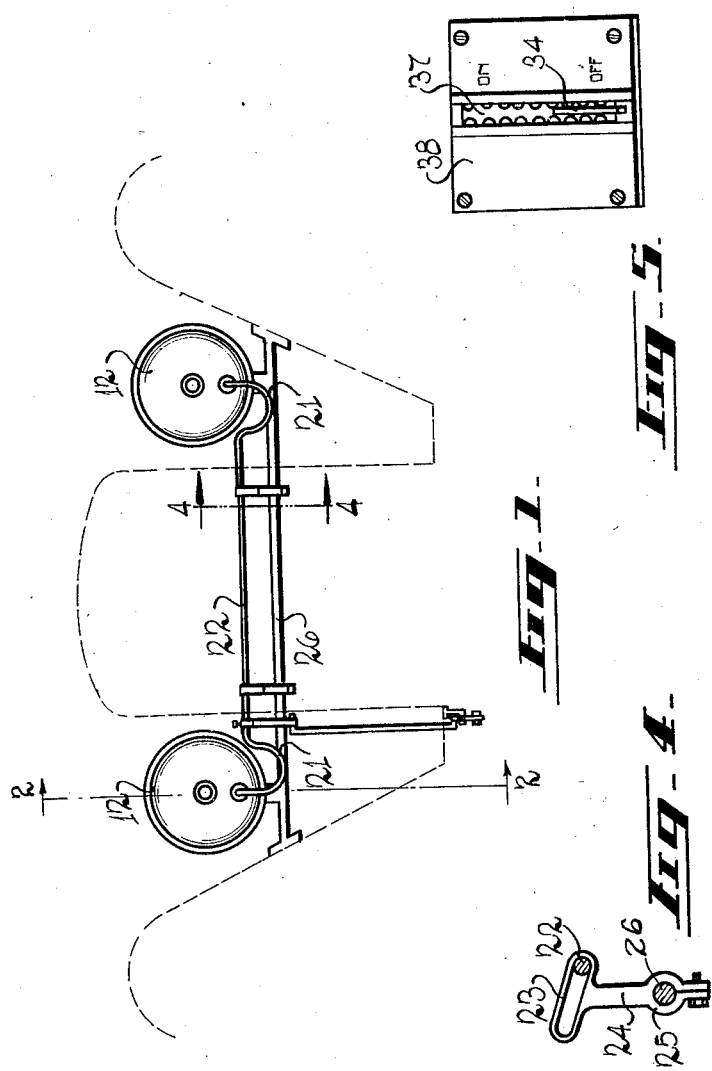

1,837,269

UNITED STATES PATENT OFFICE

HORACE ADRIAN WOOD JOSLYN, OF PIAPOT, SASKATCHEWAN, CANADA

SAFETY DIMMER

Application filed January 30, 1928, Serial No. 250,556, and in Canada May 27, 1927.

This present invention has relation to new and useful improvements in a safety dimmer for the headlights of motor vehicles and the like and has for its primary object the provision of a dimmer of simple construction and operation and which when in operative position will serve to cover the greater portion of the headlight lamp from above the same and thus direct downwardly all the rays of light from the lamp so as to still assure clear illumination of the surface ahead, while at the same time eliminate danger of blinding those approaching the vehicle from in front of the same.

Another object of the invention resides in the provision of a headlight dimmer of the character stated which is pivotally mounted over the headlight lamp and within the reflector and controlled by simple and inexpensive operating mechanism within ready reach of the operator of the motor vehicle.

A still further object of the invention resides in the provision of a headlight dimmer of the character stated which may be readily installed on motor vehicles and the like without material alterations in the construction of any of the parts of the motor vehicle.

To the accomplishment of these and related objects, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:

Figure 1 is a rear elevation showing the manner of mounting the dimmer and the dimmer controlling means on a motor vehicle of conventional form;

Figure 2 is a side elevation of the controlling means and showing the dimmer mounted in the headlight casing and reflector, the casing and reflector being shown in section (as indicated by line 2—2 on Figure 1) for the purpose of illustration of the dimmer and the mounting thereof;

Figure 3 is a front elevation of the dimmer removed.

Figure 4 is a detail view of the mounting means employed for the connecting rod between the dimmers for the two headlights; and Figure 5 is a detail elevation of the actuating lever and the indicator plate through which it operates.

Referring more in detail to the drawings, it is to be noted that the dimmer proper 6 is of spoon shape or shell shape, as shown in Figures 2 and 3, and one end 7 of the dimmer arm 8 is secured to the narrow end 9 of the dimmer proper 6 by rivets or similar means. A bumper 10 of rubber or other suitable material is provided on the outer convex face of the dimmer proper 6 to engage the reflector 11 when the dimmer is moved to inoperative position and thus protect the reflector 11 of the headlight structure 12 against injury.

A hinge member 13 is provided near the upper end 7 of the dimmer arm 8 and is secured to the inner face of the reflector 11 adjacent the opening 14 thereof through which the dimmer arm 8 operates. An appropriate hinge pin 15 is carried in the hinge member 13 and the upper end 7 of the dimmer arm 8 is mounted on the hinge pin 15, as will be readily understood from the drawings. After being extended through the opening 14 in the reflector 11, the dimmer arm 8 is turned on itself and curved downwardly and forwardly, as shown clearly in Figure 2, and is also provided with an enlarged eye 16 which works freely over the lamp socket 17 extending through the reflector 11 and supporting the headlight lamp 18 over which the dimmer proper 6 operates. The dimmer arm 8 has an elongated longitudinal slot 19 in its lower end in which works the pin 20 carried in the forward extremity of the curved end 21 of the transverse dimmer connecting rod 22. The transverse dimmer connecting rod 22 is shown in Figure 1 as being mounted transversely of the motor vehicle on the forward portion thereof and working in the inclined slots 23 in the upper ends of the upstanding supporting brackets 24 having their lower ends 25 clamped on the transverse support 26 extending between the forward mudguards of the vehicle for supporting the headlight structure 12, as illustrated clearly in Figure 1, in which view a portion of the outline of a conventional motor vehicle is indicated by dotted lines. Inclined downwardly and rearwardly from the rod 22 is a short arm 27 which is secured in adjusted position on and rigid with the rod 22 by a setscrew 28 or other appropriate means. A link 29 extends from the lower end of the short arm 27 to one arm of the bell-crank 30 which is pivoted centrally on a stationary supporting bracket 31 mounted on the vehicle structure and has connected with its other arm 32 one section 33 of the operating lever 34, the other section 35 of which is adjustable longitudinally thereon and secured in adjusted position by the clamps 36, as will be readily understood by referring to Figure 2. It will also be seen from this view in connection with Figure 5, that the lever 34 extends through and operates in the elongated slot 37 in the indicator plate 38 which may be properly mounted on the dash or any other portion of the motor vehicle structure so that the inclined end of the operating lever 34 may be in ready reach of the motor vehicle operator.

As the construction of the device has thus been described in detail, brief reference is now had to its use and operation: the device is appropriately mounted on the motor vehicle and when the operating lever 34 is in one position in the slot 37 of the indicator plate 38, the dimmer proper 6 is in its raised or inoperative position, shown by full lines in Figure 2. By reversing the position of the operating lever 34 in the slot 37 of the indicator plate 38, the bell-crank 30 is operated to draw on the link 29 and short arm 27, thus swinging the arms 8 of the dimmers proper 6 on their hinge pins 15 and moving the dimmers proper 6 downwardly to the position shown by dotted lines in Figure 2 over the headlight lamps 18, thus directing downwardly the rays of light from the headlight lamps 18, as also indicated in Figure 2. When the operating lever 34 is returned to its normal position, the bell-crank 30 is also returned to its normal position, without returning all of the operative parts to the position shown by full lines in Figure 2. It is also apparent that the dimmers 6 for both the headlight lamps 8 are operated in unison through the connecting rod 22.

From the foregoing description taken in connection with the accompanying drawings, it will be manifest that a safety dimmer for the headlights of motor vehicles and the like is provided that will fulfill all the necessary requirements of such a device, but, as many changes could be made in the above description and many apparently widely different embodiments of my invention constructed within the scope of the appended claims without departing from the spirit or scope thereof, it is intended that all matters contained in the said accompanying specification and drawings shall be interpreted as illustrative and not in a limited sense.

Having thus described my invention what I claim as new and desire to secure by Letters Patent is:—

1. A dimmer for a headlight including a dimmer member; a substantially L-shaped dimmer bracket having a short arm rigid with said dimmer member; means for hingedly mounting the L-shaped dimmer bracket adjacent the headlight lamp over which the dimmer member is engageable; the long arm of said dimmer bracket having a widened portion near its connection with the short arm of said dimmer bracket with an opening through said widened portion to permit free movement of said dimmer bracket over the lamp socket of the headlight; said long arm of the dimmer bracket having an elongated longitudinal slot at its other end; a slide member loosely connected with said longitudinally slotted end of said long arm of the dimmer bracket; and means to control movement of said slide member to adjust the dimmer member with respect to the lamp of the headlight.

2. A dimmer for headlights including a pair of dimmer members for adjustment over the respective headlight lamps; rigid L-shaped dimmer brackets having their short arms extending from and supporting said dimmer members; said L-shaped dimmer brackets being hingedly mounted with their long arms having longitudinally slotted ends; a transverse slide member having turned ends loosely connected with said longitudinally slotted ends of said long arms of the dimmer brackets; supporting and guiding means for said transverse slide member; a bell crank lever; a double link connection between one arm of said bell crank lever and said transverse slide member to operate the latter; adjustable operating means for said bell crank lever; and means to retain said adjustable operating means in set position.

In testimony whereof I hereunto affix my signature.

HORACE ADRIAN WOOD JOSLYN. [L. S.]